United States Patent [19]

Comroe et al.

[11] Patent Number: 5,260,943
[45] Date of Patent: Nov. 9, 1993

[54] TDM HAND-OFF TECHNIQUE USING TIME DIFFERENCES

[75] Inventors: Richard A. Comroe, Dundee; Robert W. Furtaw, Lake Zurich, both of Ill.

[73] Assignee: Motorola, Inc., Schaumburg, Ill.

[21] Appl. No.: 899,531

[22] Filed: Jun. 16, 1992

[51] Int. Cl.⁵ .......................... H04J 3/16; H04Q 7/04; H04Q 7/02
[52] U.S. Cl. .................................. 370/95.1; 455/33.2; 455/56.1; 379/60
[58] Field of Search ............................. 370/95.1, 95.3; 455/3.1, 33.2, 53.1, 54.1, 54.2, 56.1; 379/58, 59, 60, 63

[56] References Cited

U.S. PATENT DOCUMENTS

| | | | |
|---|---|---|---|
| 4,926,421 | 5/1990 | Kawano et al. | 370/95.1 |
| 4,972,506 | 11/1990 | Uddenfeldt | 370/95.1 |
| 5,179,559 | 1/1993 | Crisler et al. | 370/95.1 |

Primary Examiner—Wellington Chin
Attorney, Agent, or Firm—Wayne J. Egan

[57] ABSTRACT

A subscriber makes its hand-off decision based on time difference measurements between synchronization markers received from adjacent repeaters relative to the synchronization markers received from the subscriber's assigned repeater. The subscriber uses signal quality measurements to identify candidate repeaters with adequate signal level, and the time difference measurements to decide which of these repeaters is geographically closest. Thus, the subscriber unit makes hand-off decisions as its movement closes the distance to an adjacent repeater that can provide an adequate signal level.

17 Claims, 5 Drawing Sheets

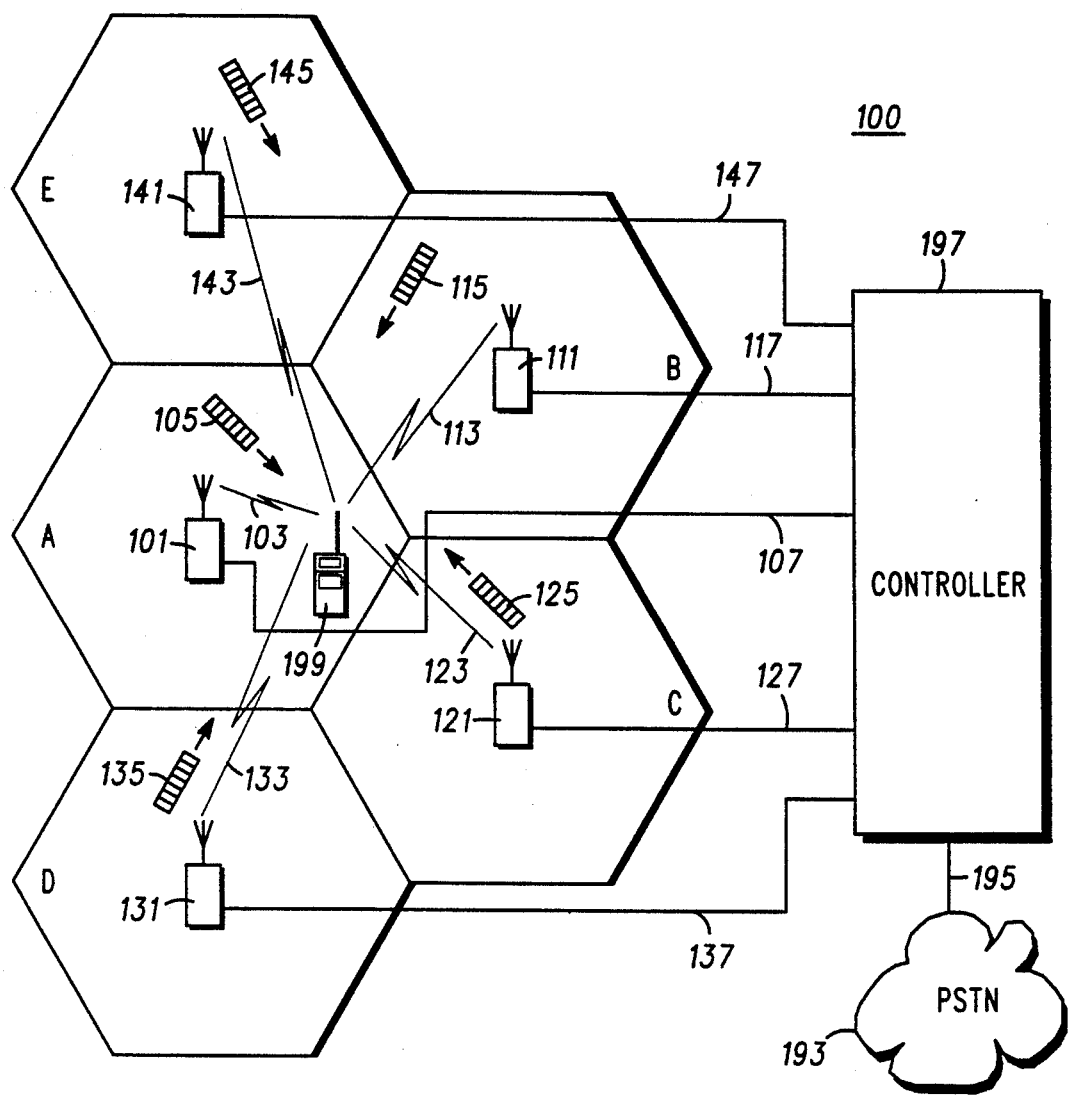
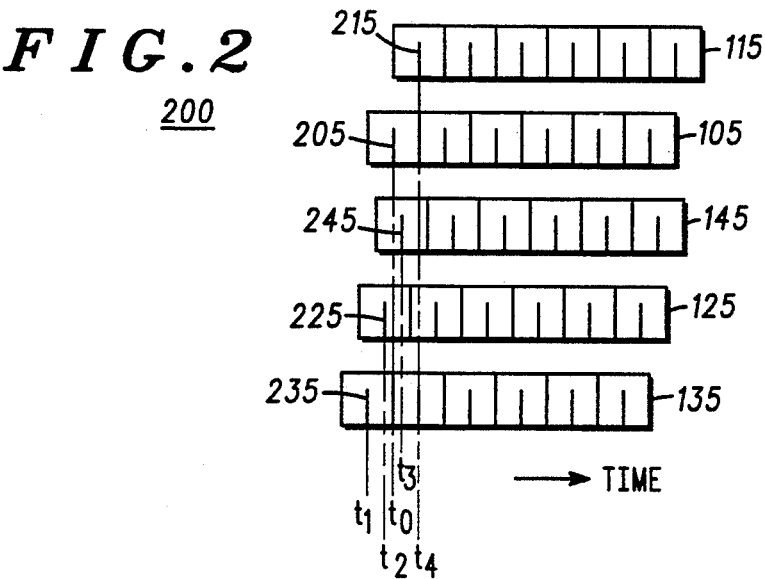
FIG.2

TDM HAND-OFF TECHNIQUE USING TIME DIFFERENCES

FIELD OF THE INVENTION

This application relates to radio frequency ("RF") communication systems including, but not limited to, those RF communication systems having multiple repeaters at multiple sites that reuse channels.

BACKGROUND OF THE INVENTION

The basic operation and structure of land mobile radio systems is known. Land mobile radio systems typically comprise one or more radio subscriber units and one or more repeaters that transceive information via RF channels. These repeaters are further located at one or more sites such that coverage is provided for subscriber units over a wider geographic area than can be provided from a single repeater. As multiple repeaters at multiple sites permits increased system capacity through re-use of the same RF channels at geographically-separated repeaters, methods are known to re-use these channels.

As increased repeater site density, or smaller cells, permits greater re-use of facilities, methods are needed to permit the system to operate with increasingly closer repeater sites and smaller cells. Further, as the size of the cells is reduced, the likelihood that a moving subscriber unit can complete a communication session within the same cell is reduced. Thus, methods are needed to provide the ability for a subscriber unit to hand-off an in-progress communication session from one repeater to a neighboring repeater with minimal disruption.

In general, the effectiveness of such hand-off methods directly impact system performance. For instance, the hand-off must protect co-channel interference between a subscriber unit using a particular channel at one repeater site and other subscribers using the same channel at other sites. Further, the hand-off methods must detect movement of the subscriber unit as it travels away from the repeater where it is assigned a channel, or else interference will occur as the unit gets closer to a site where the same channel is in use.

Methods in which the system's fixed-end equipment (repeaters, repeater controllers, and multi-site controllers) coordinate and direct the hand-off process to moving subscriber units are known. Thus, the fixed-end equipment monitors the quality of the signal currently received from the subscriber unit on the subscriber's assigned channel. When the monitored signal falls below a prescribed quality level, the multi-site controller directs the signal monitoring to be performed at the subscriber's adjacent repeaters. If the monitored signal from one of these sites exceeds a prescribed quality level, the controller then directs and coordinates the hand-off of the subscriber from the current site to the selected adjacent site. Such a method is known as "fixed network equipment directed hand-off".

Fixed network equipment hand-off methods suffer from the inability of the hand-off decision maker, i.e., the multi-site controller, to know when the subscriber unit may be travelling away from its assigned repeater and thus getting closer to adjacent repeaters. This is because testing at adjacent sites does not even occur until the quality of the monitored signal from the assigned repeater falls below the threshold.

Fixed network equipment hand-off methods also suffer from the high utilization of control links between the multi-site controller and the various repeaters that is required to control the signal monitoring and receive the quality measurements simultaneously for all subscriber units. To improve the ability to detect movement of the subscriber unit towards adjacent repeaters, testing must be performed frequently, thus resulting in increased control traffic on these links. Further, as the spacing between repeaters is reduced to increase the site density and channel re-use, the frequency of signal testing must be correspondingly increased since subscriber units now travel more quickly from one repeater to another. Moreover, the corresponding increased work-load on the multi-site controller to process all hand-off decisions further limits the frequency of testing that can be performed.

Further, fixed network equipment hand-off methods also suffer from non-symmetric signal transmission between the repeaters and the subscriber unit. Thus, compared to subscriber units, the site repeaters use higher power transmission and from elevated antennas. Further, the mixture of low-power hand-held portable subscriber units and high-powered vehicular-mounted subscriber units results in the repeaters monitoring signals with large variations in quality.

Another problem is co-channel interference. For example, a vehicular-mounted subscriber unit can move a large distance from its assigned repeater before its signal quality triggers testing at adjacent repeaters. Thus, as it gets closer to an adjacent repeater where a low-power portable unit may be using the same channel, the higher-power vehicular unit interferes with the lower-power portable unit.

Moreover, the loading of control links transporting hand-off measurement and control messages between the multi-site controller and the repeaters, and the corresponding work-load of the multi-site controller to process all hand-off decisions, effectively limits the performance and repeater site density that may be achieved.

Methods are known for the subscriber unit to assist in monitoring signal quality from its assigned and the adjacent repeaters, and then sending quality measurements to the fixed network equipment. These methods, known as "subscriber-assisted hand-off", are generally used in digital radio systems using time division multiplexing ("TDM") of the messages. As is known, in TDM systems, each channel is divided into time frames, with each frame further divided into a fixed number of time slots. Thus, multiple subscribers can simultaneously be assigned the same channel, with different units assigned to fixed slots within the frame for receiving and transmitting.

In such subscriber-assisted hand-off methods, quality measurements made by the subscriber unit and transmitted to the fixed network equipment are utilized together with quality measurements made by the fixed network equipment, such that the multi-site controller can make more appropriate hand-off decisions. Monitoring adjacent repeaters by the subscribers reduces the need for increased frequency of monitoring and testing by the fixed equipment. This is because each subscriber can scan adjacent repeaters during TDM time slots in which the subscriber unit is not receiving or transmitting.

Further, as TDM systems typically encode voice signals into digital packets for transmission in time slots, monitoring of signals can employ quality metrics based on both received signal strength and decoded bit error rates. Hand-off methods that employ such measurements are known.

Subscriber assisted hand-off methods, however, suffer some of the same problems as fixed-network equipment hand-off methods. Because of the potential transmission differences between subscribers and repeaters, fixed-network equipment measurements must still be performed. As such, control link and multi-site controller loading are still limiting factors.

Methods that shift the total hand-off decision process to the subscriber units are also known. One method, Subscriber-Directed Hand-off, for example, eliminates the limiting factors on site density and multi-site controller and control link loading. This method, however, suffers a similar problem as fixed-network equipment hand-off, since transmissions are monitored by only one side of the communications. Thus, the transmissions are now monitored by the subscriber unit instead of the fixed-network equipment. While transmission quality is the sole criteria in the hand-off decision, even though that quality measurement may include both signal strength and bit error rate, differences will still exist between the subscriber to repeater transmission path and the repeater to subscriber transmission path, thus resulting in co-channel interference.

Thus, there is a need for an improved method for subscriber directed hand-off in a multi-site radio communications system.

BRIEF DESCRIPTION OF THE DRAWINGS

FIG. 1 is a block diagram depicting a multi-repeater, TDM radio frequency communications system including a subscriber unit, that is suitable for demonstrating a first embodiment of a TDMA Hand-Off Technique Using Time Differences, in accordance with the present invention.

FIGS. 2-3 are time diagrams depicting various TDM transmissions at the subscriber unit of FIG. 1.

DETAILED DESCRIPTION

Figure 3:
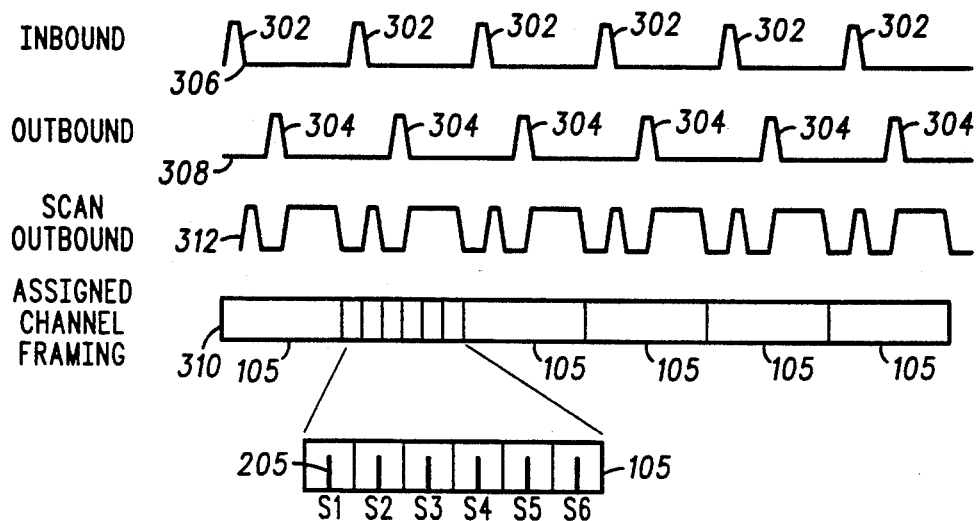

FIG. 1 is a block diagram depicting a typical multi-repeater radio system 100. Radio system 100 consists of multiple cells, A, B, C, D, and E. Each cell contains a repeater, the repeaters designated 101, 111, 121, 131, and 141. The repeaters transmit in a TDM format, consisting of a regular repetition of frames, each frame consisting of a number of distinct slots, each slot having a fixed period T. In FIG. 1, one frame 105, 115, 125, 135, and 145 is shown emanating from each repeater. Each repeater is coupled to a multi-site controller 197 via links 107, 117, 127, 137, and 147 that may be leased lines, micro-wave, or any other suitable media.

In FIG. 1, there is depicted a typical subscriber unit 199, presently located within cell A. It is assumed that the assigned cell for subscriber unit 199 is cell A. As such, the subscriber unit 199 communicates with its assigned repeater 101 via the assigned channel 103. In FIG. 1, it is assumed that the subscriber unit 199 is also capable of communicating with the adjacent repeaters 111, 121, 131, and 141, respectively, via adjacent channels 113, 123, 133, and 143, respectively.

Thus, in the multi-cell radio system 100, the subscriber unit 199 may access the public switched telephone network ("PSTN") 193 via the assigned channel 103, the assigned repeater 101, link 107, the multi-site controller 197, and link 195. In accordance with the teachings of the present invention, the subscriber unit 199 directs hand-off as it closes the distance to an adjacent repeater, B, C, D, or E, that has sufficient signal quality.

FIGS. 2-3 are time diagrams depicting various TDM transmissions at the subscriber unit of FIG. 1. Referring to FIG. 2, the transmissions from all the repeaters are shown, including a frame from the repeater that the subscriber unit is currently assigned 105, and those from the adjacent repeaters 115, 125, 145, and 135. While each of the repeaters transmits frames in unison, each frame is transmitting slots containing different messages, and on different channels, in accordance with the channels assigned to each repeater.

At any given location for the subscriber unit 199 the frames 105, 115, 125, 135, and 145 require finite propagation delays to reach the unit 199, based on the distance from the repeaters 101, 111, 121, 131, and 141. This results in different time of arrivals of the frames at the subscriber unit. Given a synchronization marker within each slot within each frame 205, 215, 225, 235, and 245, the synchronization marker within the same slot of each frame would arrive at different times $t_0$, $t_1$, $t_2$, $t_3$, and $t_4$. The moment of arrival of the synchronization word from the assigned repeater will always be denoted as $t_0$.

FIG. 3 depicts the process of subscriber unit 199 engaged in a communication session with the repeater 101 over the channel 103. Each channel 103 consists of an outbound channel 308 for conveying messages from the repeater 101, and an inbound channel 306 for conveying messages from subscriber units 199. The system 100 employs TDM, thus using repetitive frames 310, wherein each frame 105 contains a number of slots, S1 through S6.

While engaged in communications, the subscriber unit 199 will receive on an assigned slot S3 and transmit on a different assigned slot S1 within each frame 105. As long as the subscriber unit 199 is engaged in a session on the assigned channel 103 from the assigned repeater 101, it will regularly receive 304 and transmit 302 in these slot in every frame.

The controller 197 conveys the identity of at least one channel in each adjacent cell to the subscriber unit 199. In one embodiment, at least one channel at each repeater is a control channel, whose inbound channel conveys channel requests from subscriber units to the controller 197, and whose outbound channel conveys channel and slot assignments from the controller 197 to the subscriber units. The controller 197 also conveys to each designated control channel the identity of at least one channel at each adjacent repeater. As subscriber units must first locate the repeater's control channel before communications can be conducted, the subscriber unit may receive and store the identities of at least one channel at each adjacent repeater.

While not actively transmitting during a slot 302 or receiving during a slot 304, the subscriber unit 199 scans adjacent repeaters, thus during all other slots 312. While scanning, the unit 199 measures the signal quality on these adjacent channels, and detects the synchronization markers 205, 215, 225, 235, and 245 on the outbound channels of these channels. Due to the repetitive nature of all slots in the frames, the markers on any repeater will be equally spaced in time, assuming the subscriber unit remains essentially stationary. This permits the subscriber unit to sequentially scan the adjacent repeater channels, and individually average the times of arrivals of those synchronization markers $t_1$, $t_2$, $t_3$, and $t_4$.

The relative time of arrivals of the synchronization markers is, of course, related to the subscriber unit's distance from those repeaters. Generally, the earlier the arrival, the shorter the distance.

Referring to FIG. 2, note the unit 199 detects repeater A frame 105's marker 205 at $t = t_0$. By comparison, note the earlier arrival of repeater D frame 135's marker 235 at $t = t_1$ and repeater C frame 125's marker 225 at $t = t_2$ indicates the unit 199 is closer to repeaters D and C than it is to A, its current repeater. Such condition may be the result of movement of the communications unit 199 from its location depicted in FIG. 1 to a new position closer to repeater D.

Figure 5:
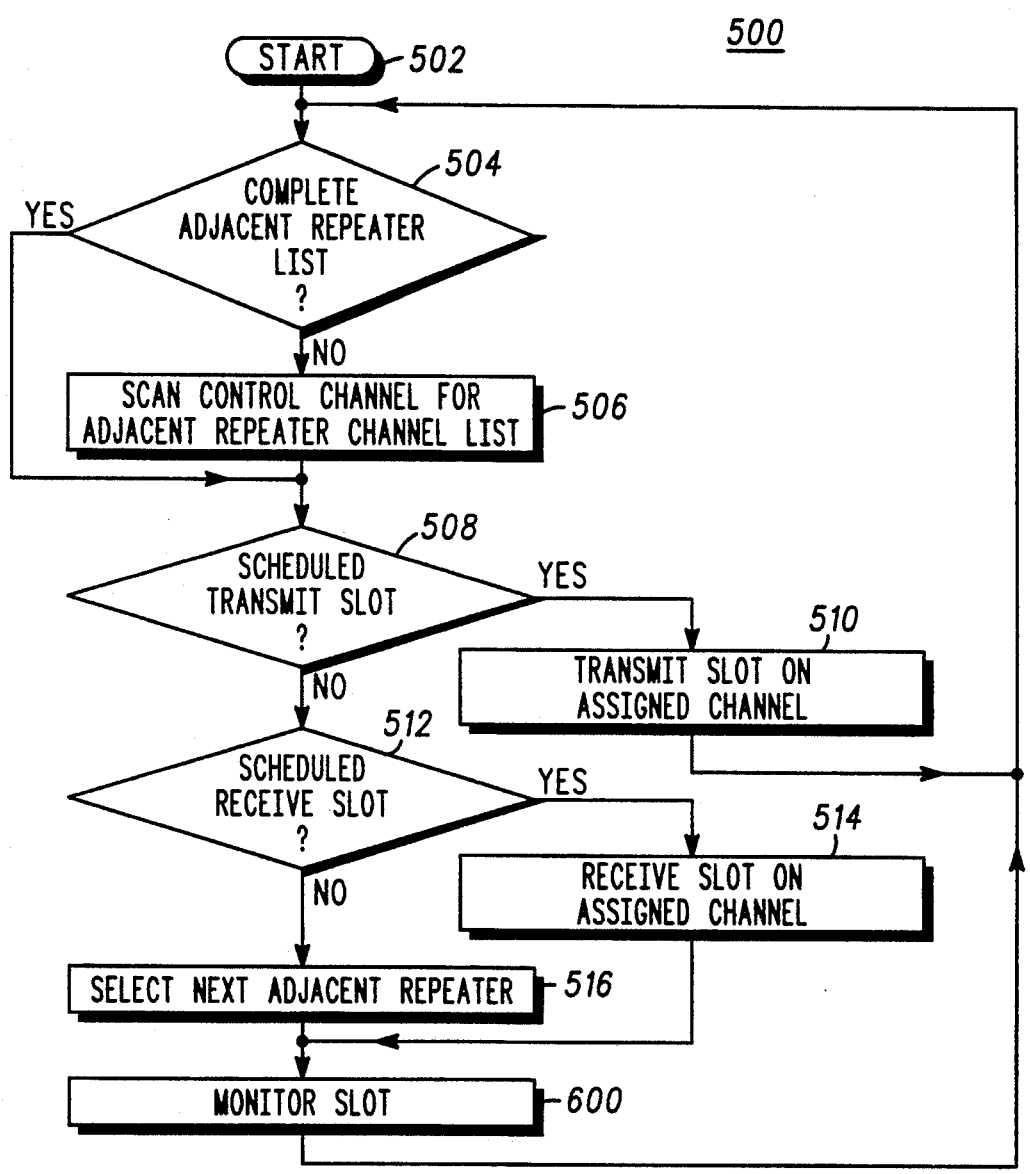
FIGS. 5-7 are flow diagrams for the subscriber unit of FIG. 1.

The unit 199 continuously performs the algorithm depicted in FIG. 5. When the unit detects adequate signal quality from a closer repeater, it makes the decision to initiate hand-off.

Figure 4:
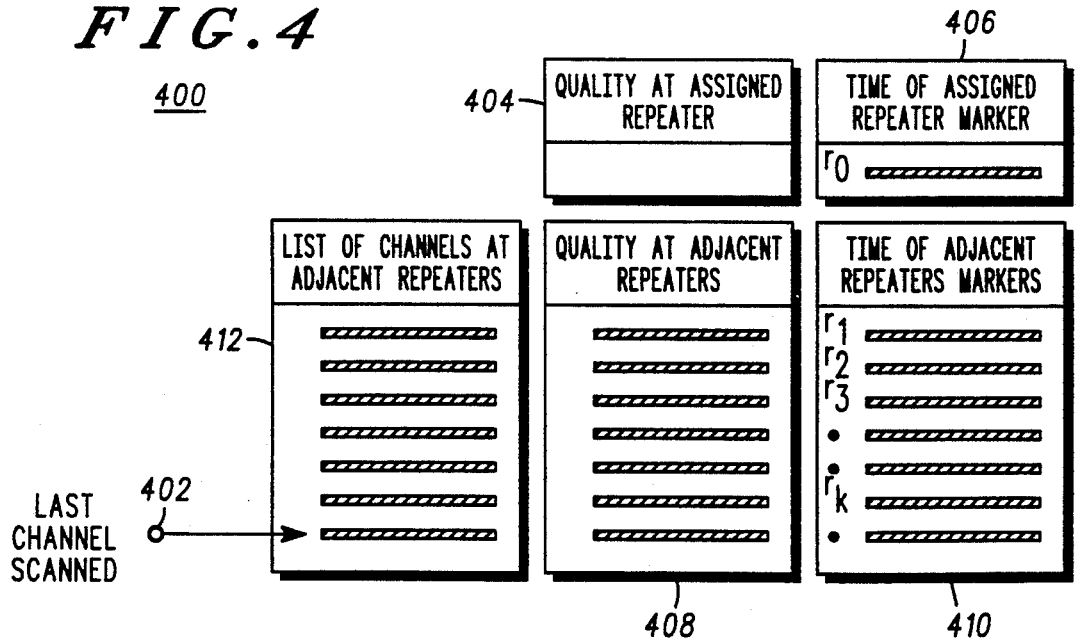
FIG. 4 illustrates various lists which may be formed by the subscriber unit of FIG. 1.

FIG. 4 illustrates various lists which may be formed by the subscriber unit of FIG. 1.

Figure 6:
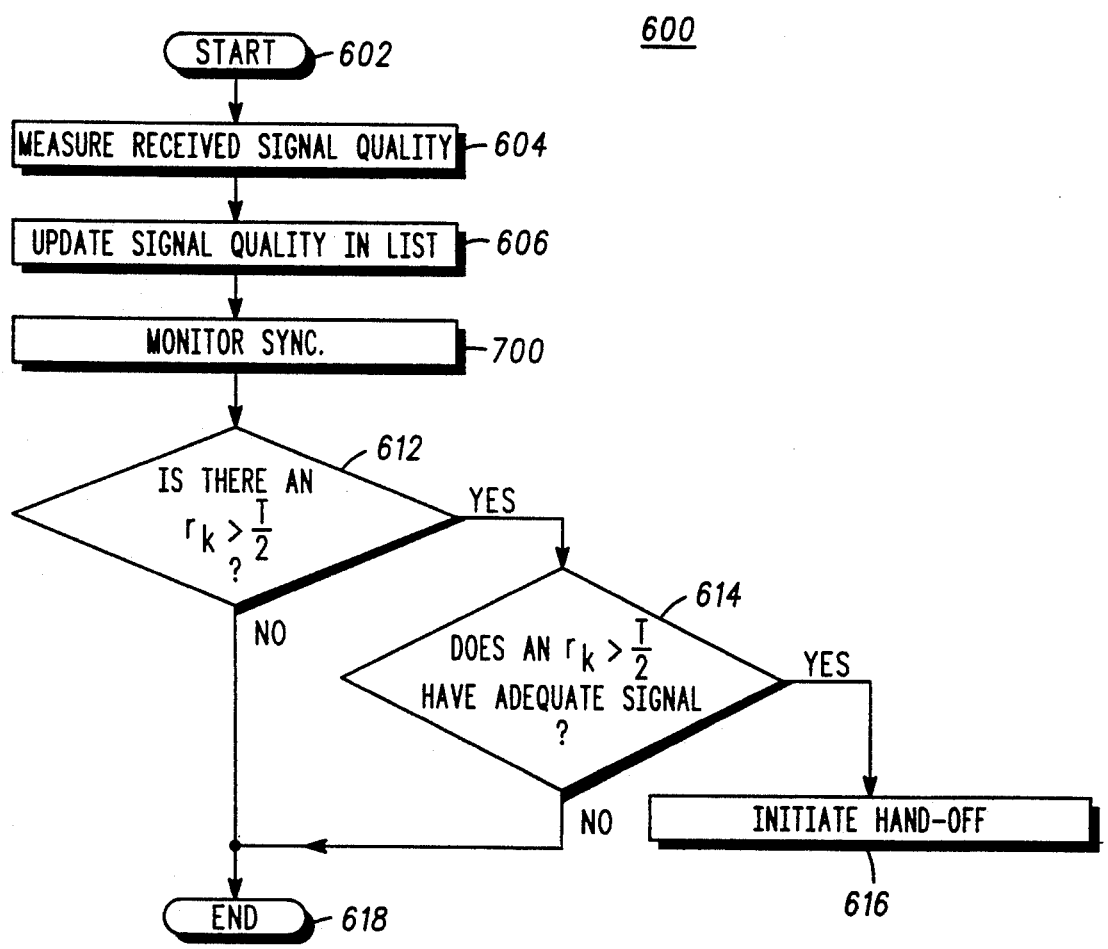
Figure 7:
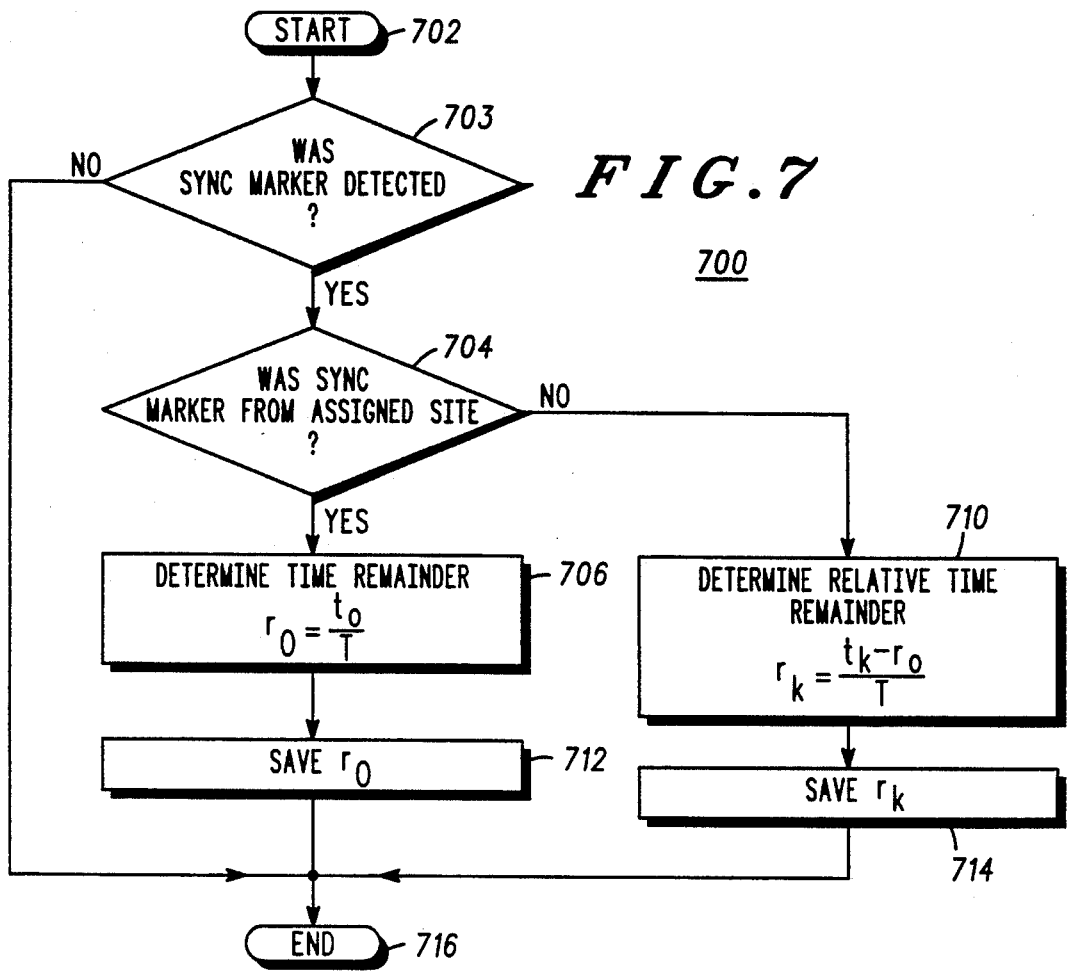

FIGS. 5-7 are flow diagrams for the subscriber unit 199 of FIG. 1. Referring to FIG. 5, the starting step 502 assumes the subscriber unit 199 is currently engaged in communications on an assigned channel from the closest repeater that the subscriber unit is able to satisfactorily communicate with. The process then goes to step 504, where it determines whether it has a complete adjacent repeater list. If this list is complete, the process goes to step 508. If this list is not complete, the process goes to step 506, where the unit acquires a new list of channels assigned to all adjacent repeaters, as in the case immediately after hand-off to a new repeater. Otherwise, the unit could have pre-programmed lists of control channels or pre-programmed lists of channels that may be scanned to locate those in use by adjacent repeaters. FIG. 4 depicts such a list 412 of control channels used by adjacent repeaters contained in the subscriber unit.

Whenever the subscriber unit's transmit slot is scheduled, step 508, the unit transmits one data slot, step 510, and returns to start, step 502. When the subscriber unit's receive slot is scheduled, step 512, the unit receives one data slot, step 514, monitors the parameters of the received slot, as per FIG. 6, and then returns to start, step 502.

When the current time is neither the unit's scheduled transmit nor receive slot, the unit selects the next adjacent repeater channel to be scanned (step 516) by advancing the value of the last channel scanned (element 402 in FIG. 4). The channel selected for scanning is then monitored for parameters of the next slot, as per FIG. 6.

FIG. 6 depicts the process of monitoring a slot, 600. After starting, step 602, the slot is monitored for signal quality, step 604. In one embodiment, quality may be determined from received signal strength, bit error rate, and/or error detection bits included in the data bits transmitted during the slot. In the unit 199, a list of quality values is maintained (element 408 in FIG. 4), with one quality value corresponding to each adjacent repeater channel. The existing quality value may be averaged with the newly-measured quality value and the result saved in the table, step 606.

Next, the slot is monitored for quality and the synchronization marker arrival timing as per FIG. 7. After monitoring is complete (per FIG. 7), the process returns to step 612, where the necessity of hand-off is decided.

Referring to FIG. 7, the monitoring process is depicted, beginning with determining the presence of a detected synchronization marker during the monitored slot, step 703. A marker may not be detected on any given slot, due to poor signal quality, multi-path fading, or interference. If no marker is detected (step 703 determination is negative), the process returns to step 612 of FIG. 6, where the necessity of hand-off is decided.

If a marker is detected (step 703 determination is affirmative), the process goes to step 704, which determines whether the synchronization marker that was detected in step 703 was from the assigned site repeater. If the answer to step 704 is affirmative, the process proceeds to step 706. But if the answer to step 704 is negative, the process goes to step 710.

It will first be assumed that step 704 decides that the synchronization marker was not received from the assigned site repeater; thus, the determination from step 704 is negative. Those skilled in the art will appreciate that the arrival time of the synchronization marker is determined from a local clock or time reference within the subscriber unit. As time perpetually continues to advance, the synchronization marker's time of arrival occurs later for each subsequent slot. However, as the time between markers is a constant, equal to the slot duration, T, a slot invariant remainder or offset time is determined, step 710. This offset time or remainder will remain invariant from slot to slot, as long as the propagation delay to reach the unit remains substantially constant. This offset time (denoted as "r", for remainder) is determined as the remainder of the actual synchronization marker detection time (denoted as "t" for time) divided by the slot duration, T, or as a modulo arithmetic operation using the slot duration.

Thus, for each slot received from the assigned repeater, the remainder of the time of arrival of the markers may be determined in a manner which is invariant from slot to slot. For adjacent site markers the relative propagation delay from its corresponding repeater may be computed, based on that marker's arrival time relative to the arrival time of markers from the assigned site. One way to do this is to first determine the time of arrival, $t_0$, of any marker sent from the assigned repeater at the subscriber unit, compute the remainder $r_0$, and then use $r_0$ as a reference to measure the arrival times of markers from adjacent repeaters.

The slot invariant remainder value of $r_0$ will actually be used as a reference as the a remainder of $$r_0 = \left(\frac{t_0}{T}\right).$$

Once $r_0$ is determined, the relative propagation delay for any kth marker, $r_k$, may be computed as the remainder of $$r_k = \left\{ \frac{t_k - r_0}{T} \right\}.$$

In the subscriber unit 199, a list of relative remainder time values is maintained (element 410 in FIG. 4), with one quality value corresponding to each adjacent channel (element 408 in FIG. 4). The remainder time value in the table may be averaged with the newly-measured remainder time value and the result saved in the table, step 714.

Returning now to step 704, if step 704 determines that the regularly-scheduled receive slot on the assigned channel is being received (i.e., step 704 determination is positive), then process goes to steps 706 and 712, and the monitored quality and remainder time value of the synchronization marker are saved in reserved locations within the subscriber unit (elements 404 and 406 in FIG. 4). The process then returns to step 612 of FIG. 6.

Once the monitor slot process has updated any values that might be modified as result of the monitoring of the signal quality and synchronization marker, the subscriber unit can make a new decision regarding whether hand-off is required, step 614 of FIG. 6.

Those skilled in the art will recognize that step 612 determines whether there is a closer repeater by determining whether any $r_k$ exceeds T/2. Also, those skilled in the art will recognize that, if the answer to step 612 is affirmative, then step 614 determines whether a closer repeater has an adequate signal.

If the determination from steps 612 and step 614 is positive, then the process goes to step 616, where hand-off occurs. Hand-off may be decided when the arrival time for a adjacent repeater marker (element 410 in FIG. 4) is prior to the arrival time for the assigned repeater marker (element 406 in FIG. 4) and the adjacent repeater signal quality (element 408 in FIG. 4) is acceptable. If more than one adjacent repeater meets this criteria, the subscriber may select the repeater with the earliest marker arrival time.

In the context of relative propagation delays which, as above, may be computed as the remainder of $$r_k = \left\{ \frac{t_k - r_0}{T} \right\}.$$

the subscriber unit determines which marker has the minimum relative propagation delay. Assuming satisfactory signal quality, the subscriber unit then selects the adjacent repeater corresponding to this marker. This process is illustrated in FIG. 6 steps 612 and 614, with reference to relative propagation delay remainders illustrated in FIG. 8.

Figure 8:
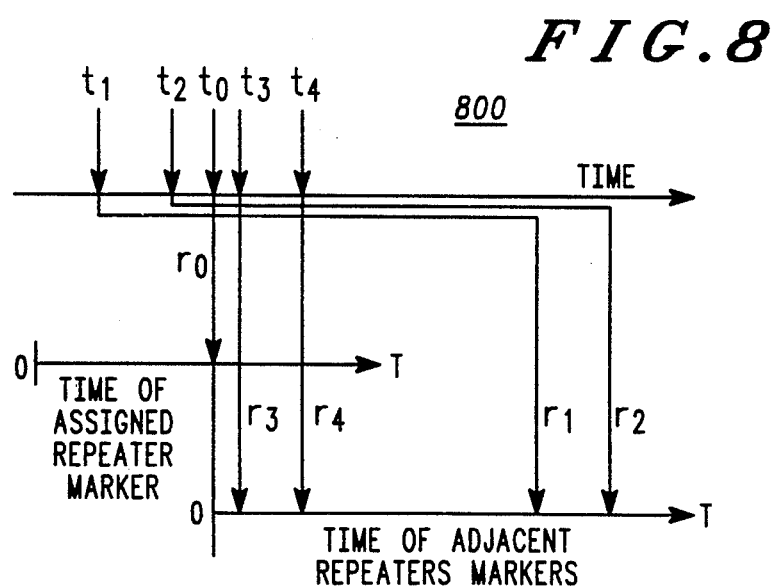
FIG. 8 illustrates typical timing events in accordance with a TDMA Hand-Off Technique Using Time Differences, in accordance with the present invention.

Referring first to FIG. 8, there are depicted the circumstances where synchronization markers from the assigned repeater are no longer the first to arrive. As previously described, this is usually due to movement of the subscriber radio to a position where the propagation delays from adjacent repeaters are now shorter than the propagation delay from the assigned repeater.

The slot invariant remainder of the time of arrival of any synchronization marker from the assigned repeater $t_0$, is shown as $r_0$ relative to the internal subscriber unit clock. Relative arrival times of the synchronization markers from any slots from the adjacent sites are also depicted relative to the $r_0$ reference, as $r_1$, $r_2$, $r_3$, and $r_4$.

Note that the remainders of relative time of arrivals earlier than $r_0$ are much greater than 0, being closer to the value T.

Referring now to FIG. 6, steps 612 and 614 provide final detail regarding the determination of when the subscriber unit would request hand-off. These steps only illustrate the hand-off determination under the circumstances when the subscriber radio detects that it is closer to an adjacent repeater site with adequate signal quality. In step 612 the data table (410) is examined to determine if a relative remainder exists which is greater than T/2. This corresponds to relative time of arrivals of synchronization markers which occur earlier than the synchronization marker from the assigned repeater. If such relative remainders greater than T/2 exist, step 614 examines the corresponding values in the quality table (408) to determine which of these sites, if any, has adequate signal quality. If such sites exist, hand-off will be requested to the site with minimum relative remainder>T/2 and adequate signal quality, through step 616. If not, step 618 returns to step 502, without requesting hand-off.

While not shown in FIG. 6, in addition to deciding hand-off whenever the subscriber unit decides that it is closer to another site with acceptable signal, another hand-off condition is decided whenever the signal quality of the assigned repeater (element 404 in FIG. 4) falls below a minimum acceptable value and the quality value of an adjacent repeater (element 408 in FIG. 4) exceeds the minimum acceptable value. Note that this hand-off criteria may force hand-off to a further-away repeater, in an attempt to maintain a minimum quality level to the assigned communication. Since the algorithm of FIG. 6 is performed continuously, hand-off back to a closer repeater would occur as soon as a closer repeater provided a minimum acceptable signal quality.

When the subscriber unit determines that a hand-off should be performed, the subscriber unit requests hand-off from the selected repeater on that repeater's inbound control channel. If a channel is allocated from the selected repeater (assuming channels are available and the quality of the request is received with sufficient quality by the selected repeater), a channel assignment is transmitted back on the outbound control channel.

The hand-off request is conveyed from the newly selected repeater to the multi-repeater controller 197, where the communications is redirected from the previous (assigned) repeater to the new (selected) repeater. Receiving a channel assignment from the new repeater, the subscriber unit switches to the new repeater, clears all the tables in FIG. 4, and begins scanning the control channel of the new repeater, step 506, during slots other than those involved in transmitting and receiving, to build a new list of channels at adjacent repeaters (element 412 in FIG. 4).

Thus, a TDM Hand-Off Technique using Time Differences, in accordance with the present invention, is provided. In accordance with the teachings of the invention, a subscriber makes its hand-off decision based on time difference measurements between synchronization markers received from adjacent repeaters relative to the synchronization markers received from the subscriber's assigned repeater. A key advantage is that a subscriber, in accordance with the present invention, uses not only signal quality measurements to identify candidate repeaters with adequate signal level (as in the prior art) but, in contrast to the prior art, the subscriber also uses the time difference measurements to decide which of these repeaters is geographically closest. Thus, the subscriber unit makes hand-off decisions as its movement closes the distance to an adjacent repeater that can provide an adequate signal level.

While various embodiments of the TDM Hand-Off Technique using Time Differences, in accordance with the present invention, have been described hereinabove, the scope of the invention is defined by the following claims.

What is claimed is:

1. In a radio frequency ("RF") communications system having a plurality of cells, each cell having a repeater for transmitting slots to and receiving slots from subscriber units located within the cell, each slot having a period T and including a marker, and wherein a predetermined subscriber unit in an assigned cell having an assigned repeater may be handed-off to a plurality of n adjacent cells having n adjacent repeaters, a method for handing-off the predetermined subscriber unit to an adjacent repeater, comprising the steps of, at the predetermined subscriber unit:

(a) receiving a slot from each of the n adjacent repeaters, thus forming n received slots;
(b) determining a quality value for each of the n received slots;
(c) from the n received slots, selecting slots having a quality value $\geq$ a predetermined threshold, thus forming m selected slots with m corresponding adjacent repeaters, where $m \leq n$;
(d) receiving a slot from the assigned repeater;
(e) for the m selected slots, determining the m arrival times of the corresponding m markers at the predetermined subscriber unit, and for the slot from the assigned repeater determining the arrival time $t_0$ of the corresponding marker from the assigned repeater;
(f) determining when at least one adjacent repeater of the m adjacent repeaters is closer to the predetermined subscriber unit than the assigned repeater, based on the m arrival times of the m markers, and based on the arrival time $t_0$ of the marker from the assigned repeater;
(g) determining when only one adjacent repeater of the plurality of n adjacent repeaters is closer to the predetermined subscriber unit than the assigned repeater; and,
(h) handing-off to the adjacent repeater determined in step (g).

2. The method of claim 1, where the step (e) includes a step of averaging $t_0$ and the m arrival times of the m markers over time.

3. The method of claim 1, where step (b) includes a step of measuring the received signal strength.

4. The method of claim 1, where step (b) includes a step of measuring the bit error rate.

5. The method of claim 1, where step (b) includes a step of averaging the quality value over time.

6. The method of claim 1, where the RF communications system utilizes time division multiplexing ("TDM") frames.

7. In a radio frequency ("RF") communications system having a plurality of cells, each cell having a repeater for transmitting slots to and receiving slots from subscriber units located within the cell, each slot having a period T and including a marker, and wherein a predetermined subscriber unit in an assigned cell having an assigned repeater may be handed-off to a plurality of n adjacent cells having n adjacent repeaters, a method for handing-off the predetermined subscriber unit to an adjacent repeater, comprising the steps of, at the predetermined subscriber unit:

(a) receiving a slot from each of the n adjacent repeaters, thus forming n received slots;
(b) determining a quality value for each of the n received slots;
(c) from the n received slots, selecting slots having a quality value $\geq$ a predetermined threshold, thus forming m selected slots with m corresponding adjacent repeaters, where $m \leq n$;
(d) receiving a slot from the assigned repeater;
(e) for the m selected slots, determining the m arrival times of the corresponding m markers at the predetermined subscriber unit, and for the slot from the assigned repeater determining the arrival time $t_0$ of the corresponding marker from the assigned repeater;
(f) determining when at least one adjacent repeater of the m adjacent repeaters is closer to the predetermined subscriber unit than the assigned repeater, based on the m arrival times of the m markers, and based on the arrival time $t_0$ of the marker from the assigned repeater;
(g) determining when a plurality of adjacent repeaters of the n adjacent repeaters is closer to the predetermined subscriber unit than the assigned repeater;
(h) determining the adjacent repeater of the plurality of adjacent repeaters as in step (g) that is closest to the predetermined subscriber unit, based on the m arrival times of the m markers; and,
(i) handing-off to the adjacent repeater determined in step (h).

8. In a radio frequency ("RF") communications system having a plurality of cells, each cell having a repeater for transmitting slots to and receiving slots from subscriber units located within the cell, each slot having a period T and including a marker, and wherein a predetermined subscriber unit in an assigned cell having an assigned repeater may be handed-off to a plurality of n adjacent cells having n adjacent repeaters, a method for handling-off the predetermined subscriber unit to an adjacent repeater, comprising the steps of, at the predetermined subscriber unit:

(a) receiving a slot from each of the n adjacent, thus forming n received slots;
(b) determining a quality value for each of the n received slots;
(c) from the n received slots, selecting slots having a quality value $\geq$ a predetermined threshold, thus forming m selected slots with m corresponding adjacent repeaters, where $m \leq n$;
(d) receiving at least one slot from the assigned repeater;
(e) for the m selected slots, determining the m arrival times of the corresponding m markers at the predetermined subscriber unit, and for the slot from the assigned repeater determining the arrival time $t_0$ of the corresponding marker from the assigned repeater;
(f) determining the adjacent repeater of the m adjacent repeaters that is closest to the predetermined subscriber unit, based on the m arrival times of the m markers, and based on the arrival time $t_0$ of the marker from the assigned repeater; and, (g) handing-off to the adjacent repeater determined in step (f).

9. The method of claim 8, where the step (d) includes a step of averaging $t_0$ and the m arrival times of the corresponding m markers over time.

10. The method of claim 8, where step (b) includes a step of measuring the received signal strength.

11. The method of claim 8, where step (b) includes a step of measuring the bit error rate.

12. The method of claim 8, where step (b) includes a step of detecting error detection bits.

13. The method of claim 8, where step (b) includes a step of averaging the quality value over time.

14. The method of claim 8, where the RF communication system utilizes time division multiplexing ("TDM") frames.

15. In a radio frequency ("RF") communications system having a plurality of cells, each cell having a repeater for transmitting slots to and receiving slots from subscriber units located within the cell, each slot having a period T and including a marker, and wherein a predetermined subscriber unit in an assigned cell having an assigned repeater may be handed-off to a plurality of n adjacent cells having n adjacent repeaters, a method for handing-off the predetermined subscriber unit to an adjacent repeater, comprising the steps of, at the predetermined subscriber unit:

(a) receiving a slot from each of the n adjacent repeaters, thus forming n received slots;

(b) receiving a slot from the assigned repeater;

(c) for the n received slots determining the n arrival times of the corresponding n markers at the predetermined subscriber unit, and for the slot from the assigned repeater determining the arrival time $t_0$ of the corresponding marker from the assigned repeater;

(d) determining the adjacent repeater that is closest to the predetermined subscriber unit, based on the n arrival times of the n markers, and based on the arrival time $t_0$ of the marker from the assigned repeater; and, (e) handing-off to the adjacent repeater determined in step (d).

16. The method of claim 15, wherein the step (c) includes a step of averaging $t_0$ and the n arrival times of the n markers over time.

17. The method of claim 15, where the RF communication system utilizes time division multiplexing ("TDM") frames.

* * * * *